(12) United States Patent
Li et al.

(10) Patent No.: US 8,453,131 B2
(45) Date of Patent: *May 28, 2013

(54) METHOD AND APPARATUS FOR ORDERING CODE BASED ON CRITICAL SECTIONS

(75) Inventors: Long Li, Shanghai (CN); Jinquan Dai, Shanghai (CN); Xiaofeng Guo, Shanhai (CN)

(73) Assignee: Intel Corporation, Santa Clara, CA (US)

( * ) Notice: Subject to any disclaimer, the term of this patent is extended or adjusted under 35 U.S.C. 154(b) by 1314 days.

This patent is subject to a terminal disclaimer.

(21) Appl. No.: 11/662,217

(22) PCT Filed: Dec. 24, 2005

(86) PCT No.: PCT/CN2005/002307
§ 371 (c)(1),
(2), (4) Date: Mar. 8, 2007

(87) PCT Pub. No.: WO2007/073611
PCT Pub. Date: Jul. 5, 2007

(65) Prior Publication Data
US 2009/0049433 A1 Feb. 19, 2009

(51) Int. Cl.
*G06F 9/45* (2006.01)
(52) U.S. Cl.
USPC ........... 717/149; 717/140; 717/144; 717/151; 717/156
(58) Field of Classification Search
USPC ....................................................... 717/149
See application file for complete search history.

(56) References Cited

U.S. PATENT DOCUMENTS

| 5,544,342 | A  * | 8/1996 | Dean .............................. 711/119 |
| 6,038,538 | A  * | 3/2000 | Agrawal et al. .................... 705/7 |
| 6,427,235 | B1 * | 7/2002 | Kosche et al. ................. 717/148 |
| 6,651,246 | B1 * | 11/2003 | Archambault et al. ....... 717/160 |
| 7,120,762 | B2 * | 10/2006 | Rajwar et al. ................. 711/150 |
| 7,890,943 | B2 * | 2/2011 | Guo et al. ..................... 717/160 |
| 8,037,466 | B2 * | 10/2011 | Guo et al. ..................... 717/159 |
| 2003/0120480 | A1 * | 6/2003 | Mohri et al. ..................... 704/4 |
| 2004/0039900 | A1 * | 2/2004 | Heishi et al. .................. 712/234 |
| 2004/0187101 | A1 * | 9/2004 | Inagaki et al. ................. 717/159 |
| 2005/0050527 | A1 | 3/2005 | McCrady et al. |
| 2005/0060705 | A1 | 3/2005 | Katti et al. |
| 2005/0091025 | A1 * | 4/2005 | Wilson et al. .................... 703/16 |
| 2005/0108695 | A1 * | 5/2005 | Li et al. ......................... 717/144 |
| 2005/0108696 | A1 * | 5/2005 | Dai et al. ....................... 717/151 |
| 2005/0177831 | A1 * | 8/2005 | Goodman et al. ............ 718/100 |
| 2005/0204119 | A1 * | 9/2005 | Saha ............................. 712/235 |
| 2005/0210208 | A1 | 9/2005 | Long et al. |
| 2006/0048111 | A1 * | 3/2006 | Archambault et al. ....... 717/144 |
| 2006/0048124 | A1 * | 3/2006 | Martin .......................... 717/160 |
| 2006/0053351 | A1 * | 3/2006 | Anderson et al. ............ 714/100 |
| 2006/0085782 | A1 * | 4/2006 | Ward ............................. 716/18 |
| 2010/0223605 | A1 * | 9/2010 | Dai et al. ....................... 717/151 |

* cited by examiner

*Primary Examiner* — Emerson Puente
*Assistant Examiner* — Hiren Patel
(74) *Attorney, Agent, or Firm* — Trop, Pruner & Hu, P.C.

(57) ABSTRACT

A method of compiling code includes ordering instructions that protect and release critical sections in the code to improve parallel execution of the code according to an intrinsic order of the critical sections. According to one embodiment, the intrinsic order of the critical sections in the code is determined from data dependence and control dependence of instructions in the critical sections, and additional dependencies are generated to enforce the intrinsic order of the critical sections. Other embodiments are described and claimed.

11 Claims, 12 Drawing Sheets

```
int a = 0;
int b = 0;
extern int c;
for(;;)
{
    if(c%2 == 0)
    {
        a = a + 1;
        b = f(a);
    }
}
```

METHOD AND APPARATUS FOR ORDERING CODE BASED ON CRITICAL SECTIONS

FIELD

An embodiment of the present invention relates to compilers. More specifically, an embodiment of the present invention relates to a method and apparatus for ordering code based on critical sections.

BACKGROUND

Modern computer systems are capable of supporting multithreaded and multiprocess applications. These computer systems include single processor systems that perform simultaneous multithreading, multicore processor systems, and multiple processor systems. Applications, such as network packet processing, which are highly parallel and typically multithreaded and/or multiprocessed are able to take advantage of these capabilities in these computers systems In a parallel programming paradigm, accesses to global resources are often protected to ensure mutual exclusiveness and synchronizations between threads. The instructions in code which require mutual exclusiveness and synchronization between threads may be referred to as critical sections. Critical sections may be protected by using a token based protection scheme where each thread awaits a signal from a previous thread before entering a critical section. Upon receiving the signal, the thread may execute the code in the critical section exclusively. After the code has been executed, the thread may send a signal to a next thread which allows the next thread to enter the critical section. In such a token based critical section implementation, each thread is required to pass a token, such as a signal, to a next thread exactly once in any path of the program.

In such a parallel programming paradigm, critical sections with different orders on different execution paths and critical sections having more instructions than required may adversely impact the performance of a program.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. However, it will be apparent to one skilled in the art that specific details in the description may not be required to practice the embodiments of the present invention. In other instances, well-known components, programs, and procedures are shown in block diagram form to avoid obscuring embodiments of the present invention unnecessarily.

Figure 1:
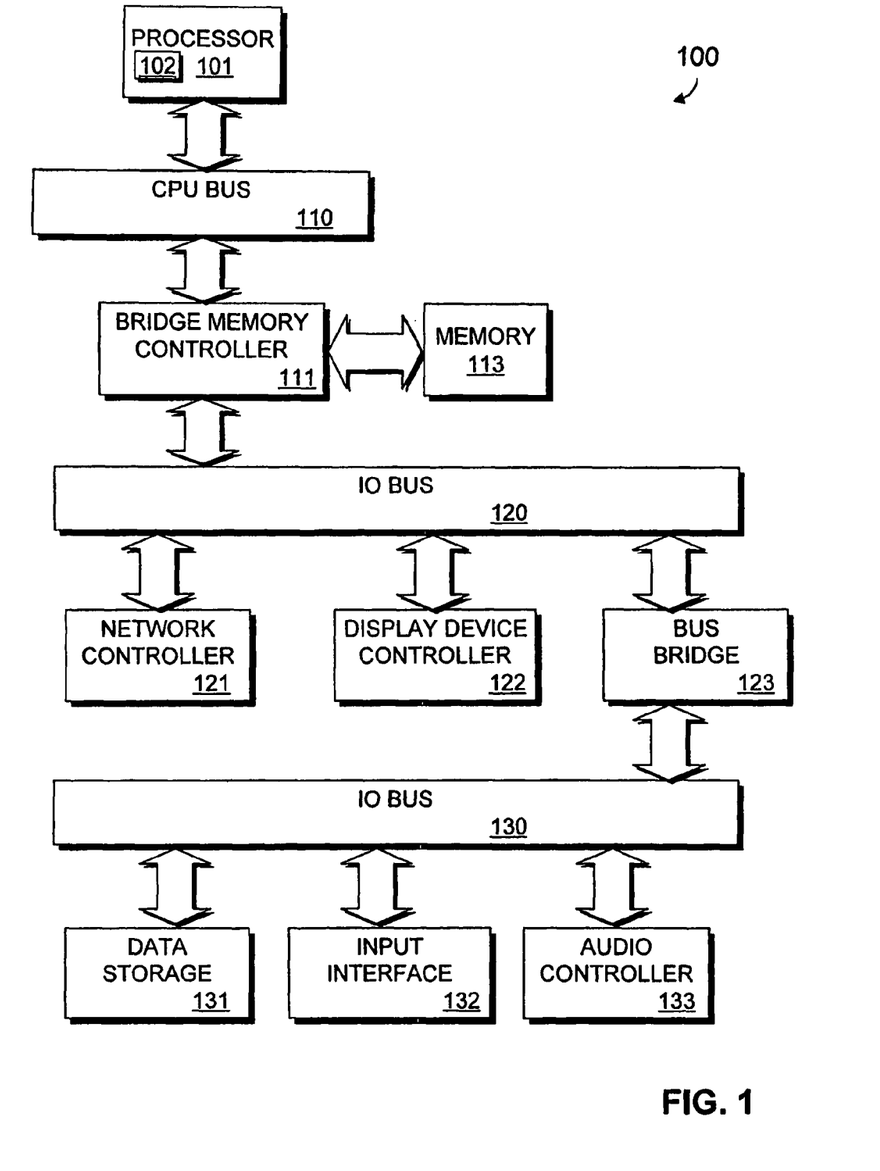
FIG. 1 is a block diagram of an exemplary computer system in which an example embodiment of the present invention may be implemented.

FIG. 1 is a block diagram of an exemplary computer system 100 according to an embodiment of the present invention. The computer system 100 includes a processor 101 that processes data signals and a memory 113. The processor 101 may include one or more processor cores. The processor 101 may be a complex instruction set computer microprocessor, a reduced instruction set computing microprocessor, a very long instruction word microprocessor, a processor implementing a combination of instruction sets, or other processor device. FIG. 1 shows the computer system 100 with a single processor. However, it is understood that the computer system 100 may operate with multiple processors. Additionally, each of the one or more processors may support one or more hardware threads. The processor 101 is coupled to a CPU bus 110 that transmits data signals between processor 101 and other components in the computer system 100.

The memory 113 may be a dynamic random access memory device, a static random access memory device, read-only memory, and/or other memory device. The memory 113 may store instructions and code represented by data signals that may be executed by the processor 101. According to an example embodiment of the computer system 100, a compiler may be stored in the memory 113 and implemented by the processor 101 in the computer system 100. The compiler may identify an intrinsic order in which critical sections of code in a program should be executed. The intrinsic order may be used to optimize the compilation of code. According to an embodiment of the present invention, the intrinsic order may be used to order instructions that protect and release critical section in the code to improve parallel execution of the code.

A cache memory 102 resides inside processor 101 that stores data signals stored in memory 113. The cache 102 speeds access to memory by the processor 101 by taking advantage of its locality of access. In an alternate embodiment of the computer system 100, the cache 102 resides external to the processor 101. A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first IO bus 120.

The first IO bus 120 may be a single bus or a combination of multiple buses. The first IO bus 120 provides communication links between components in the computer system 100. A network controller 121 is coupled to the first IO bus 120. The network controller 121 may link the computer system 100 to a network of computers (not shown) and supports communication among the machines. A display device controller 122 is coupled to the first IO bus 120. The display device controller 122 allows coupling of a display device (not shown) to the computer system 100 and acts as an interface between the display device and the computer system 100.

A second IO bus 130 may be a single bus or a combination of multiple buses. The second IO bus 130 provides communication links between components in the computer system 100. A data storage device 131 is coupled to the second IO bus 130. The data storage device 131 may be a hard disk drive; a floppy disk drive, a CD-ROM device, a flash memory device or other mass storage device. An input interface 132 is coupled to the second IO bus 130. The input interface 132 may be, for example, a keyboard and/or mouse controller or other input interface. The input interface 132 may be a dedicated device or can reside in another device such as a bus controller or other controller. The input interface 132 allows coupling of an input device to the computer system 100 and transmits data signals from an input device to the computer system 100. An audio controller 133 is coupled to the second IO bus 130. The audio controller 133 operates to coordinate the recording and playing of sounds and is also coupled to the IO bus 130. A bus bridge 123 couples the first IO bus 120 to the second IO bus 130. The bus bridge 123 operates to buffer and bridge data signals between the first IO bus 120 and the second IO bus 130.

Figure 2:
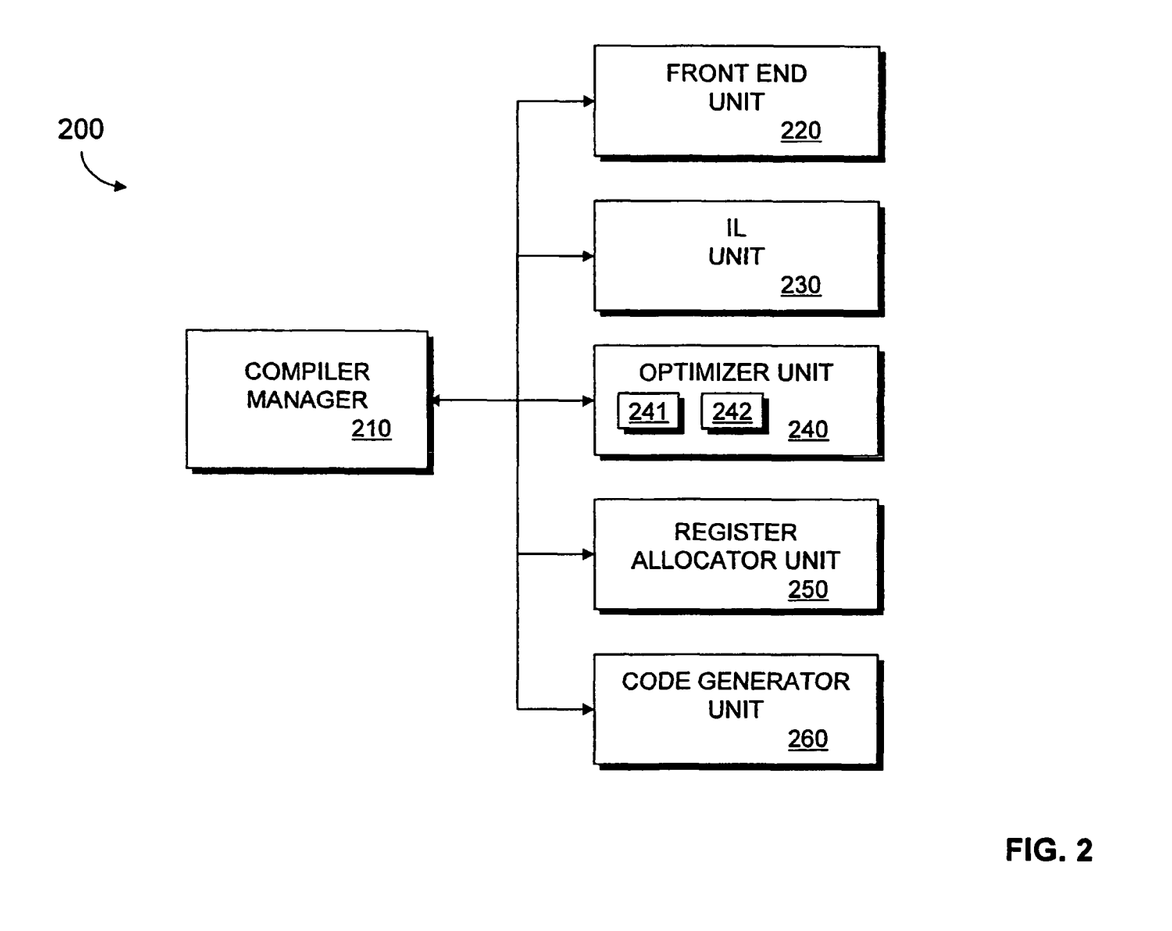
FIG. 2 is a block diagram that illustrates a compiler according to an example embodiment of the present invention.

FIG. 2 is a block diagram that illustrates a compiler 200 according to an example embodiment of the present invention. The compiler 200 includes a compiler manager 210. The compiler manager 210 receives source code to compile. The compiler manager 210 interfaces with and transmits information between other components in the compiler 200.

The compiler 200 includes a front end unit 220. According to an embodiment of the compiler 200, the front end unit 220 operates to parse source code and convert it to an abstract syntax tree.

The compiler 200 includes an intermediate language unit 230. The intermediate language unit 230 transforms the abstract syntax tree into a common intermediate form such as an intermediate representation. It should be appreciated that the intermediate language unit 230 may transform the abstract syntax tree into one or more common intermediate forms.

The compiler 200 includes an optimizer unit 240. The optimizer unit 240 may utilize one or more optimization procedures to optimize the intermediate representation of the code. According to an embodiment of the compiler 200, the optimizer unit 240 may perform peephole, local, loop, global, interprocedural and/or other optimizations. According to an embodiment of the compiler 200, the optimizer unit 240 includes a critical section ordering unit 241. The critical section ordering unit 241 determines the intrinsic order of critical sections in the code. According to one embodiment, the critical section ordering unit 241 determines the intrinsic order of the critical sections in the code from data dependence and control dependence of instructions in the critical sections. The critical section ordering unit 241 may also generate additional dependencies to enforce the intrinsic order of the critical sections to improve parallel execution of the code. According to an embodiment of the compiler 200, the optimizer unit 240 includes a code motion unit 242. The code motion unit 242 orders instructions including instructions that protect and release critical sections in the code in response to the intrinsic order of the critical sections. According to an embodiment of the code motion unit 242, the additional dependencies generated by the critical section ordering unit 241 guide the code motion unit 242 to perform the appropriate ordering.

The compiler 200 includes a register allocator unit 250. The register allocator unit 250 identifies data in the intermediate representation that may be stored in registers in the processor rather than in memory.

The compiler 200 includes a code generator unit 260. The code generator unit 260 converts the intermediate representation into machine or assembly code.

Figure 3:
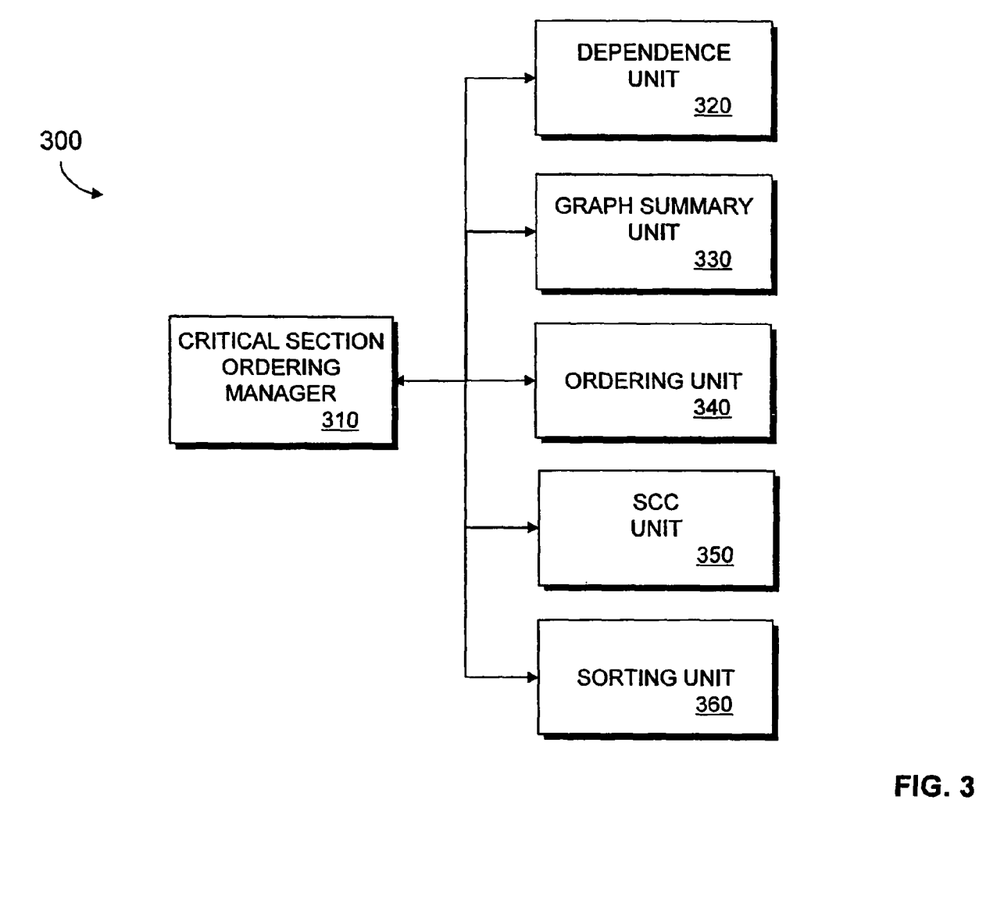
FIG. 3 is a block diagram of a critical section ordering unit according to an example embodiment of the present invention.

FIG. 3 is a block diagram of a critical section ordering unit 300 according to an example embodiment of the present invention. The critical section ordering unit 300 may be used to implement the critical section ordering unit 241 shown in FIG. 2. The critical section ordering unit 300 includes a critical section ordering manager 310. The critical section ordering manager 310 interfaces with and transmits information between other components in the critical section ordering unit 300.

The critical section ordering unit 300 includes a dependence unit 320. The dependence unit 320 generates an instruction dependence graph of instructions in the code. According to an embodiment of the section ordering unit 300, the dependence unit 320 generates the instruction dependence graph by constructing a control flow graph of the code, computing flow dependence and output dependence of instructions by using a forward and disjunctive data flow, computing anti dependence of the instructions by using a backward and disjunctive data flow, and adding the flow dependence and output dependence of instructions with the anti dependence of the instructions. It should be appreciated that other techniques may be used to generate the instruction dependence graph.

The critical section ordering unit 300 includes a graph summary unit 330. The graph summary unit 330 generates a summarized graph reflecting only instructions that protect and release the critical sections. According to an embodiment of the critical section ordering unit 300, the graph summary unit 330 generates the summarized graph by building a transitive closure of the instruction dependence graph generated by the dependence unit 320, and adding an edge from a node n to a node m if there is a path from a node n to a node m in the instruction dependence graph, where n and m represent instructions that protect or release a critical section. It should be appreciated that other techniques may be used to generate the summarized graph.

The critical section ordering unit 300 includes an ordering unit 340. The ordering unit 340 generates a relative order graph of the critical sections. According to an embodiment of the critical section ordering unit 300, the ordering unit 340 generates the relative order graph by adding an edge (i,j) if there is an edge (i,j) in the summarized graph generated by the graph summary unit 330, where i is a node corresponding to an instruction that protects a critical section and j is a node corresponding to an instruction that releases the critical section. It should be appreciated that other techniques may be used to generate the relative order graph.

The critical section ordering unit 300 includes a strong connected component (SCC) unit 350. The strong connected component unit 350 generates a SCC graph of the relative order graph. According to one embodiment, the SCC graph may be a directed acyclic graph where each node represents a set of critical sections.

The critical section ordering unit 300 includes a sorting unit 360. The sorting unit 360 performs a topological sort of the SCC to determine the intrinsic order of the critical sections. The sorting unit 360 may also generate additional dependencies that may be used to enforce the intrinsic order of the critical sections. The additional dependencies may be reflected in an enhanced instruction dependence graph.

Figure 4:
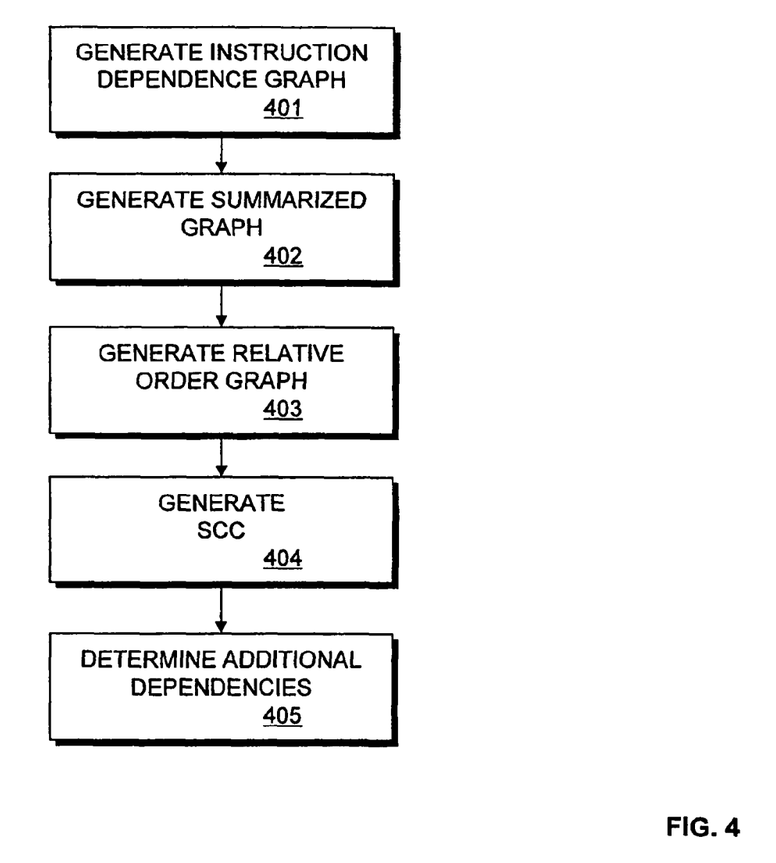
FIG. 4 is a flow chart of a method for determining dependencies to order critical sections according to an example embodiment of the present invention.

FIG. 4 is a flow chart of a method for generating dependencies to order critical sections according to an example embodiment of the present invention. At 401, an instruction dependence graph of instructions in the code is generated. According to an embodiment of the present invention, the instruction dependence graph may be generated by constructing a control flow graph of the code, computing flow dependence and output dependence of instructions by using a forward and disjunctive data flow, computing anti dependence of the instructions by using a backward and disjunctive data flow, and adding the flow dependence and output dependence of instructions with the anti dependence of the instructions. It should be appreciated that other techniques may be used to generate the instruction dependence graph.

At 402, a summarized graph that reflects only instructions that protect and release critical sections is generated. According to an embodiment of the present invention, the summarized graph may be generated by building a transitive closure of the instruction dependence graph generated at 401, and adding an edge from a node n to a node m if there is a path from a node n to a node m in the instruction dependence graph, where n and m represent instructions that protect or release a critical section. It should be appreciated that other techniques may be used to generate the summarized graph.

At 403, a relative order graph of the critical sections is generated. According to an embodiment of the present invention, the relative order graph may be generated by adding an edge (i,j) if there is an edge (i,j) in the summarized graph generated at 402, where i is a node corresponding to an instruction that protects a critical section and j is a node corresponding to an instruction that releases the critical section. It should be appreciated that other techniques may be used to generate the relative order graph.

At 404, a SCC of the relative order graph is generated. According to one embodiment, the SCC graph may be a directed acyclic graph where each node represents a set of critical sections. The SCC of the relative order graph reveals the intrinsic order of the critical sections.

At 405, additional dependencies to enforce the intrinsic order of the critical sections are determined. According to an embodiment of the present invention, the SCC graph generated at 404 is topologically sorted to determine the intrinsic order of the critical sections. The additional dependencies may be reflected in an enhanced instruction dependence graph.

FIG. 4 is a flow chart illustrating a method for generating dependencies to order critical sections according to an example embodiment of the present invention. The techniques illustrated in FIG. 4 may be performed sequentially, in parallel or in an order other than that which is described. It should be appreciated that not all of the techniques described are required to be performed, that additional techniques may be added, and that some of the illustrated techniques may be substituted with other techniques.

According to an embodiment of the present invention, a method is disclosed to order critical sections in code such that the critical sections are executed by different execution paths in the same order. The instructions used for protecting and releasing the critical sections in the code may also be ordered to minimize or compact the critical sections so that parallelism between threads may be improved.

Two critical sections may have some deterministic order on some paths in the program based on the data and control dependence of the codes they contain, and may have no dependence on other paths. Additional dependencies (artificial dependencies) may be introduced to the corresponding instructions that protect and release the critical sections so that the same order for the critical sections is enforced on all execution paths. The additional dependencies may also be used to minimize or compact protected critical sections. This would free up other instructions in the code for other threads to execute and improve the parallelism between threads.

Figure 5A:
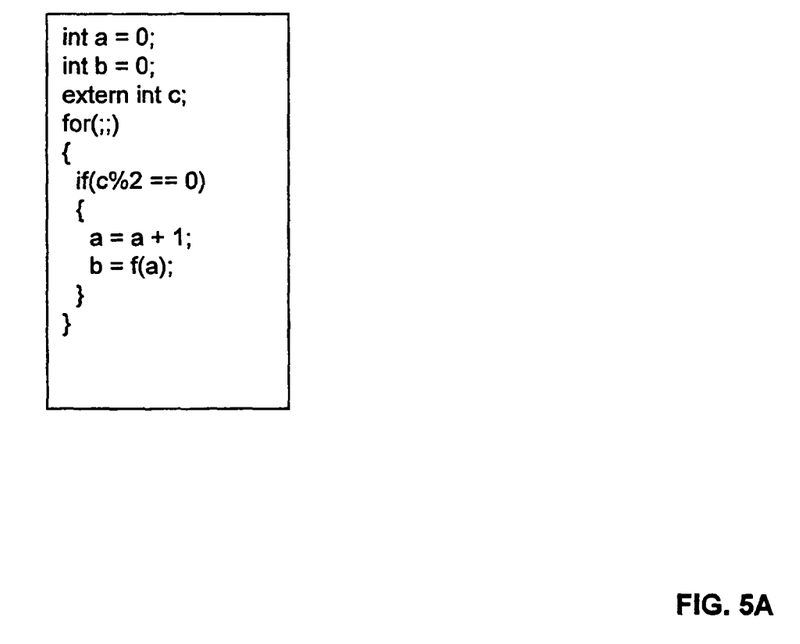
FIG. 5a is an exemplary program according to an example embodiment of the present invention.
Figure 5B:
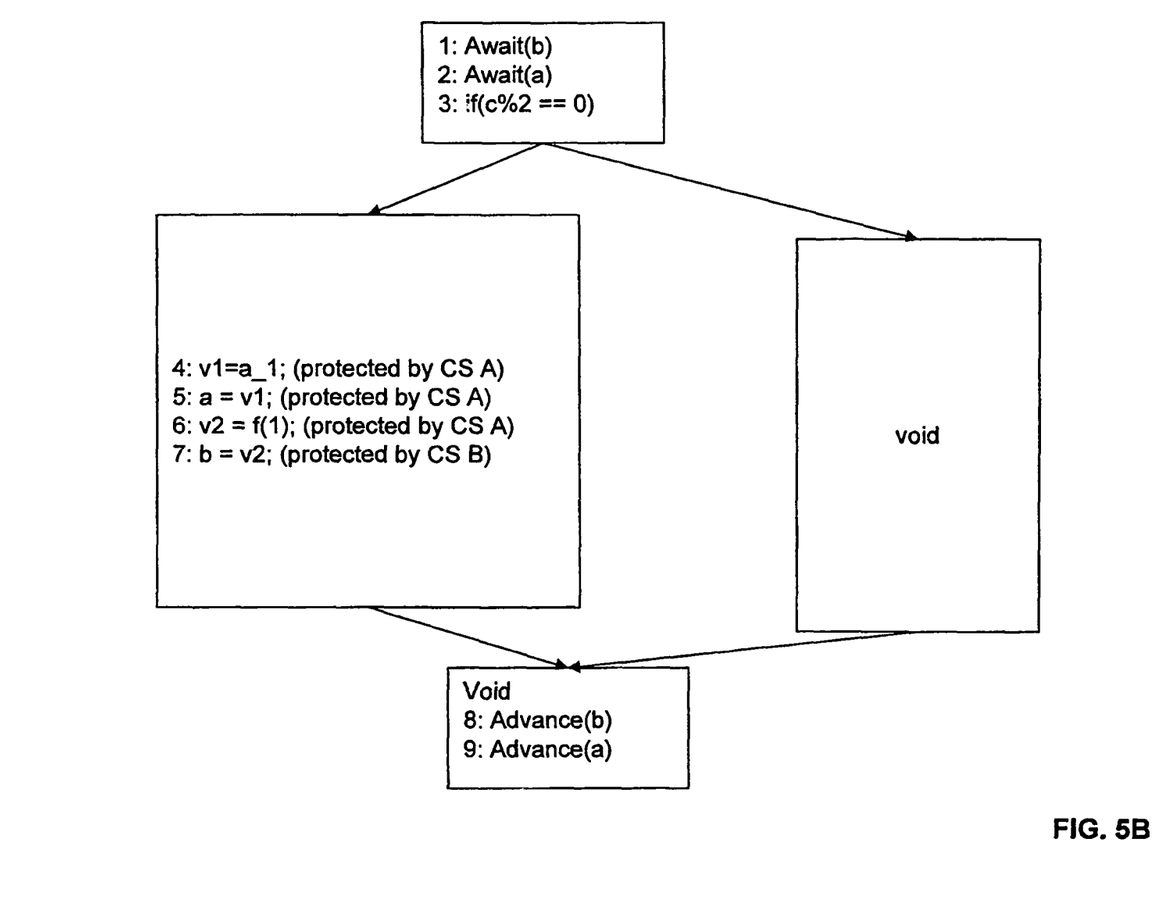
FIG. 5b illustrates the source code in an intermediate representation after instructions that protect and release critical sections are introduced.

The following illustrates an example of how code may be ordered based on critical sections according to embodiment of the present invention. FIG. 5*a* illustrates an exemplary program according to an example embodiment of the present invention. The program is shown in source code form written in the C programming language. FIG. 5*b* illustrates the source code in an intermediate representation after instructions that protect and release critical sections are introduced. The critical sections in the code include instructions that access or modify the integers a and b. The lines of instructions are numbered from 1-9.

Figure 6:
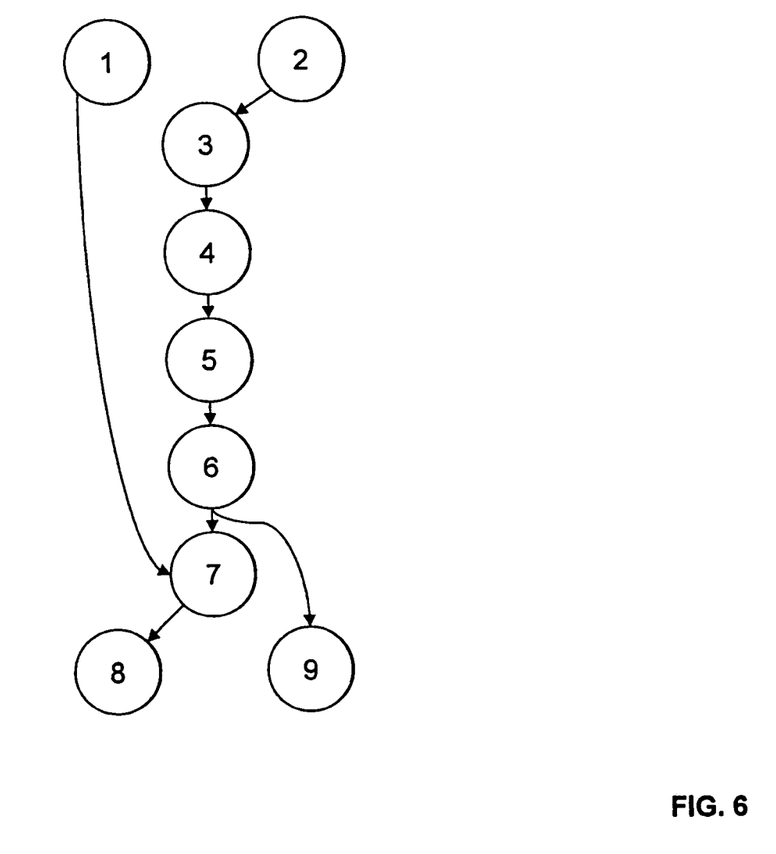
FIG. 6 is an exemplary instruction dependence graph according to an example embodiment of the present invention.

With reference to FIG. 4, at 401 an instruction dependence graph is generated of the instructions in the code illustrated in FIG. 5*b*. FIG. 6 illustrates exemplary instruction dependence graph of the code illustrated in FIG. 5*b* according to an example embodiment of the present invention. The instruction dependence graph illustrates the instructions in FIG. 5*b* as represented with nodes. The flow, output, and control dependencies are represented with the edges connecting the nodes. The instruction dependence graph may be generated as described with reference to 401.

Figure 7:
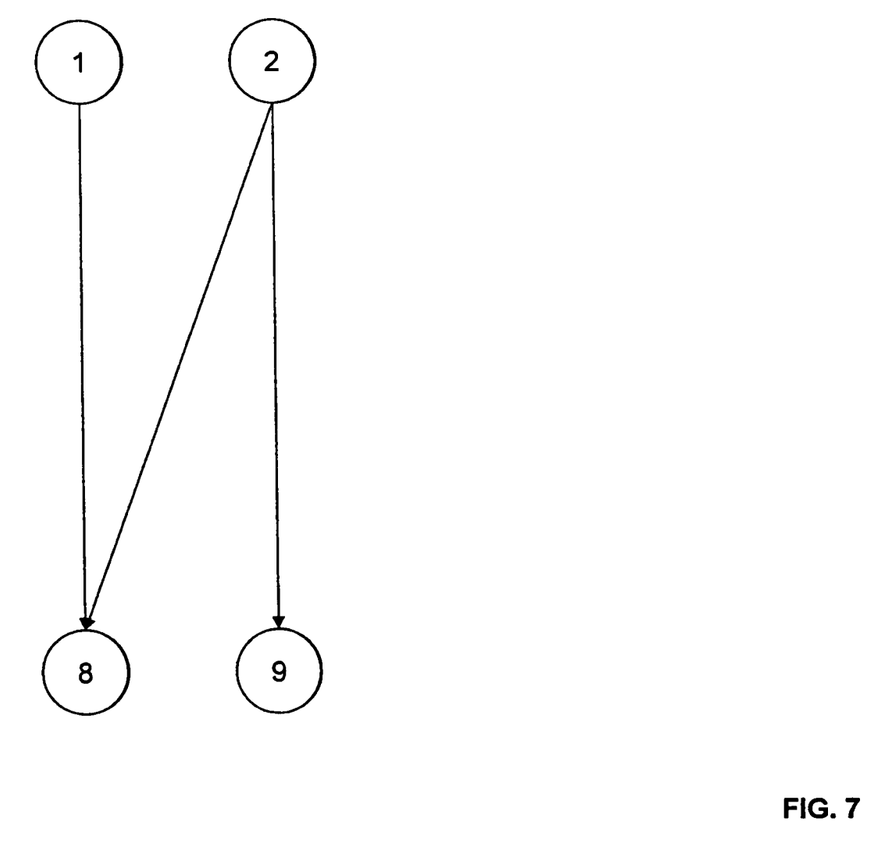
FIG. 7 is an exemplary summarized dependence graph according to an example embodiment of the present invention.

At 402, a summarized graph that reflects only instructions that protect and release critical sections is generated. FIG. 7 illustrates an exemplary summarized dependence graph of the instructions that protect and release the critical sections in the code in FIG. 5*b* according to an example embodiment of the present invention. The summarized dependence graph may be generated as described with reference to 402.

Figure 8:
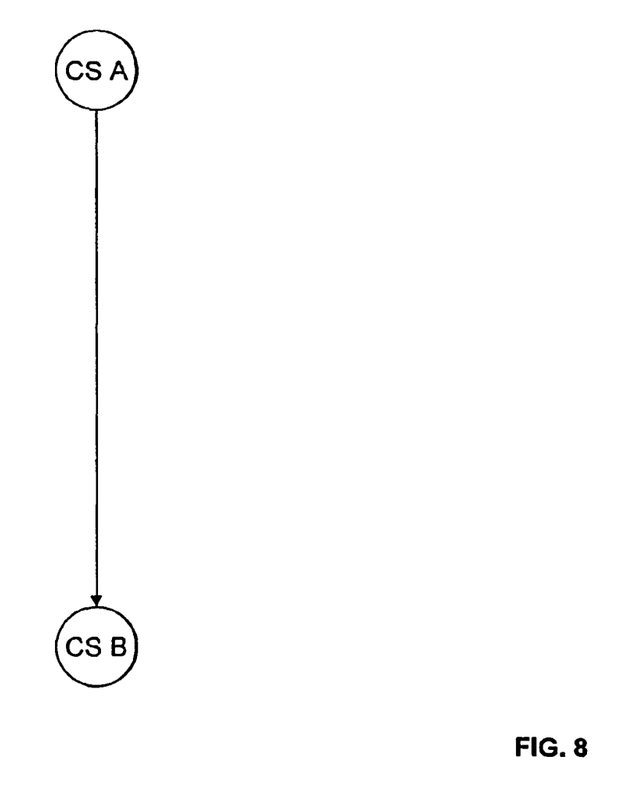
FIG. 8 is an exemplary relative order graph of critical sections according to an example embodiment of the present invention.

At 403, a relative order graph of the critical sections is generated. FIG. 8 is an exemplary relative order graph of critical sections in the code in FIG. 5*b* according to an example embodiment of the present invention. The nodes in the critical order graph, CS A and CS B, represent critical sections in the code. The relative order graph may be generated as described with reference to 403.

Figure 9:
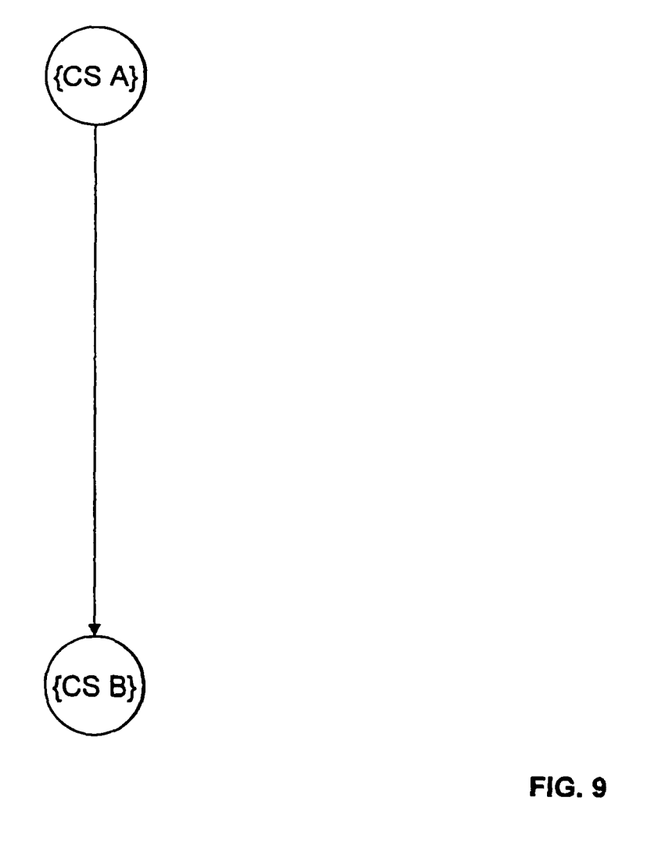
FIG. 9 is an exemplary strong connected component (SCC) graph according to an example embodiment of the present invention.

At 404, a SCC of the relative order graph is generated. FIG. 9 is an exemplary SCC graph of the relative order graph in FIG. 8. The SCC of the relative order graph reveals the intrinsic order of the critical sections, that critical section A should be performed before critical section B.

Figure 10:
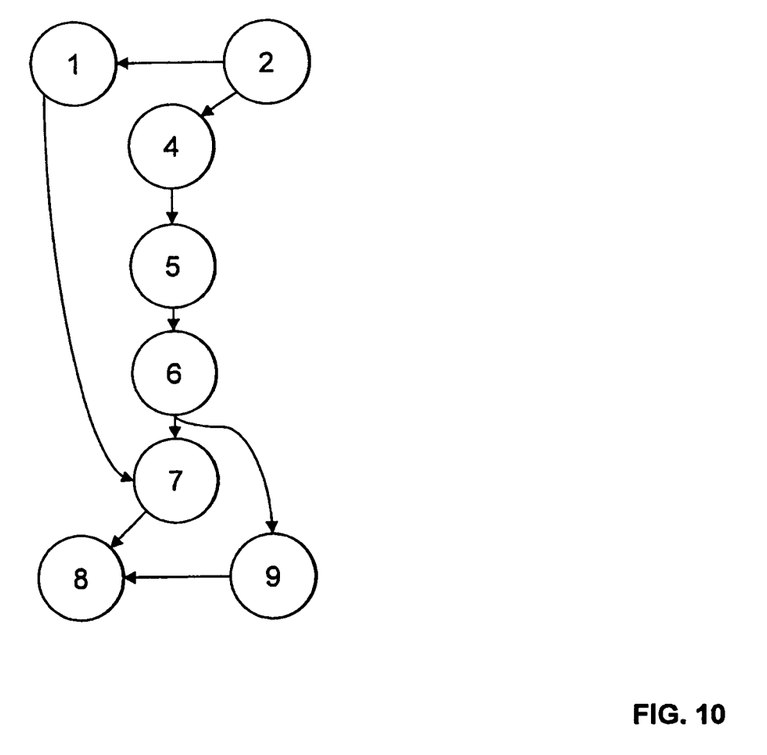
FIG. 10 is an exemplary enhanced dependence graph according to an example embodiment of the present invention.

At 405, additional dependencies to enforce the intrinsic order of the critical sections are determined. FIG. 10 is an exemplary enhanced dependence graph according to an example embodiment of the present invention. The exemplary enhanced dependence graph include the additional dependency of instruction 2 (instruction that protects critical section A) to instruction 1 (instruction that protects critical section B), and instruction 9 (instruction that releases critical section A) to instruction 8 (instruction that releases critical section B).

Figure 11:
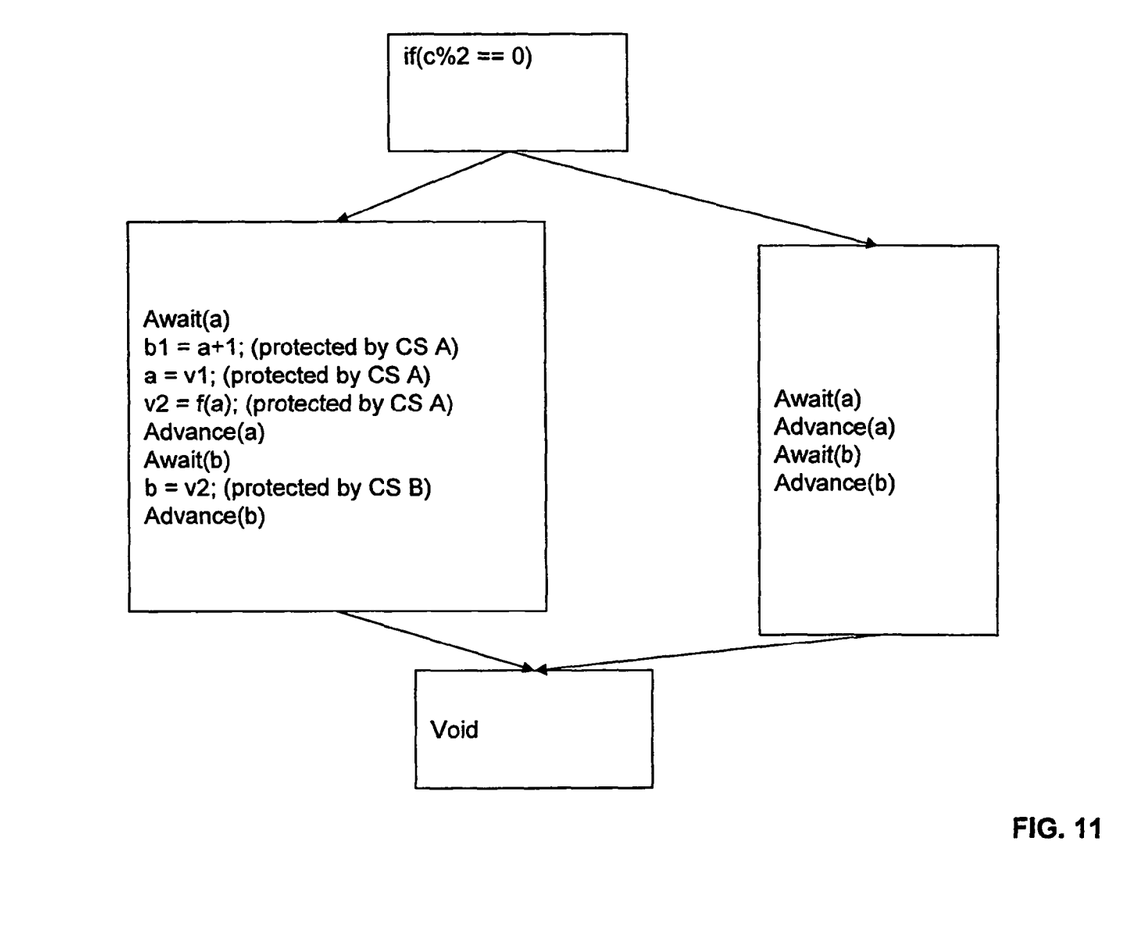
FIG. 11 illustrates the exemplary program after code motion is performed using the enhanced dependence graph.

FIG. 11 illustrates the exemplary program after code motion is performed using the enhanced dependence graph.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method of compiling code, comprising:
    generating an instruction dependence graph of instructions in the code;
    generating a summarized graph reflecting only the instructions that protect and release critical sections;
    generating a relative order graph of the critical sections from the summarized graph;
    generating a strong connected component (SCC) graph of the relative order graph;
    ordering the instructions that protect and release the critical sections to improve parallel execution of the code according to an intrinsic order of the critical sections; and
    compacting at least one of the critical sections based on one of the summarized graph and the SCC graph;
    wherein at least one of the generating and ordering procedures is performed by a processor.

2. The method of claim 1, further comprising determining data dependence and control dependence of instructions in the code.

3. The method of claim 1, further comprising determining the intrinsic order of the critical sections based on data dependence and control dependence of instructions in the critical sections.

4. The method of claim 1, further comprising:
    determining the intrinsic order of the critical sections from data dependence and control dependence of instructions in the critical sections; and
    generating additional dependencies to enforce the intrinsic order of the critical sections.

5. The method of claim 1, further comprising
    topologically sorting the SCC graph to determine additional dependencies to enforce the intrinsic order of the critical sections.

6. The method of claim 1, wherein the critical sections comprise code that may be executed by only one thread at a time.

7. An article of manufacture comprising a non-transitory machine accessible medium including sequences of instructions, the sequences of instructions including instructions which when executed cause the machine to perform:
    generating an instruction dependence graph of instructions in the code;
    generating a summarized graph reflecting only the instructions that protect and release critical sections;
    generating a relative order graph of the critical sections from the summarized graph;
    generating a strong connected component (SCC) graph of the relative order graph;
    generating additional dependencies to enforce an intrinsic order of the critical sections; and
    ordering the instructions that protect and release critical sections to improve parallel execution of the code according to the intrinsic order of the critical sections.

8. The article of manufacture of claim 7, further comprising instructions which when executed causes the machine to further perform determining the data dependence and the control dependence of the instructions in the critical sections.

9. A compiler implemented on a processor, comprising:
    a critical section ordering unit, to determine intrinsic order of critical sections in code, comprising
    (a) a graph summary unit to generate a summarized graph reflecting only instructions that protect and release the critical sections;
    (b) an ordering unit to generate a relative order graph of the critical sections from the summarized graph;
    (c) a strong connected component (SCC) unit to generate a SCC graph of the relative order graph; and
    a code motion unit to order instructions including the instructions that protect and release critical sections in response to the intrinsic order of the critical sections;
    wherein at least one of the generating and ordering procedures is to be performed by the processor and the processor is to compact at least one of the critical sections based on one of the summarized graph and the SCC graph.

10. The apparatus of claim 9, wherein the critical section ordering unit comprises a dependence unit to generate an instruction dependence graph of instructions in the code.

11. The apparatus of claim 9, wherein the critical section ordering unit comprises a sorting unit to determine additional dependencies to enforce the intrinsic order of the critical sections.

* * * * *